United States Patent [19]
Perot et al.

[11] 3,739,383
[45] June 12, 1973

[54] HYBRID NAVIGATION SYSTEM
[75] Inventors: Gilbert Perot, Versailles; Emile Labin; Miguel Da Silveira, both of Paris, all of France
[73] Assignee: Pechiney-Progil, Lyon, France
[22] Filed: June 5, 1969
[21] Appl. No.: 832,554

Related U.S. Application Data
[63] Continuation-in-part of Ser. No. 402,966, Oct. 9, 1964, abandoned.

[30] Foreign Application Priority Data
Sept. 28, 1963 France.............................. 63949002

[52] U.S. Cl...... 343/112 R, 235/150.27, 343/112 C
[51] Int. Cl.............................................. G01s 5/00
[58] Field of Search...................... 343/112, 112.1; 235/150.27

[56] References Cited
UNITED STATES PATENTS
3,204,241  8/1965  Bjorkman .......................... 343/112
3,397,400  8/1968  Maass et al. ............... 235/150.27 X
3,453,624  7/1969  Rockey ............................. 343/112

Primary Examiner—Benjamin A. Borchelt
Assistant Examiner—Richard E. Berger
Attorney—Waters, Roditi, Schwartz & Nissen

[57]    ABSTRACT

A hybrid navigation system including an inertial navigation system on a vehicle to be located and a time base signal generator and a receiver on the vehicle. The receiver is coupled to the generator and adapted to receive incoming location signals transmitted from remote stations. Phase differences are determined between the location signals and reference signals generated by the generator. A computer computes on the basis of an error formula and from data received from the inertial navigation system, the reference signals and the phase differences, a correction of position issuing from the inertial system and a corrected position. The computer also computes, from the corrected position, values of the phases of the reference signals corresponding to those which would have been received if the corrected position were true. The time base means is responsive to said values and controls the receiver, computer and determination of phase differences. The computer computes from the phase differences and position values updated values of the parameters of the error formula.

7 Claims, 7 Drawing Figures

HYBRID NAVIGATION SYSTEM

OTHER APPLICATIONS

The present application is a continuation-in-part of our copending application, Ser. No. 402,966, filed on Oct. 9, 1964, now abandoned.

The present invention relates to hybrid navigation systems and, more particularly, to a class of such systems in which a means for determining the position of a vehicle is combined with an inertial navigation system in order to compensate errors accumulated by the latter system.

In known hybrid navigation systems, attempts are made to derive advantages from the measurements of a position by non-inertial means for calibrating the inertial navigation system and for reducing its systematic errors. In these prior systems, there is only a partial combination of the two kinds of systems since the determination of the position by non-inertial means does not derive all the available advantages of the presence of an inertial navigation system.

According to one distinguishing feature of the present invention, means are provided not only for enabling the measurement of position errors of the inertial navigation system and to correct the same, but also and mainly to make use of the knowledge of the movement of the vehicle to be located as supplied by the inertial navigation system to improve considerably the sensitivity of the measurement of the position without sacrificing its precision.

The proposed system must, on the other hand, be able to withstand particularly strong jamming without introducing errors into the indications of the inertial navigation system even when the radio measurement is effected. For this purpose, use is made on the one hand of a signal extractor having a very narrow final pass band and a negligible delay which is considerably below the period of time during which the signal is "integrated" and, on the other hand, no direct action is effected upon the inertial navigation system but a computation of its systematic error is made and account is taken of said error in a suitable way.

In a system according to features of the present invention, the signal extractor is rendered insensitive to the displacements of the vehicle to be located. The information about its position given by the inertial navigation system duly corrected enables this result.

According to another feature of the present invention it is proposed to realize a precise locating measurement even when the ratio of the power of the signals to the power of existing noise is very much smaller than one. This is possible, according to known general theory, only if the energy of the received signals during all the duration of the measurements is of the order of the spectral density of noise (said noise being assumed to be "white noise"). In order that this "energy ratio" be sufficiently large, while permitting the "power ratio" to be small, it is necessary and it is sufficient that "the duration of the measurement", which is also called "duration of integration", be long.

One of the aspects of the present invention consists of integrating the position measurement during a period of time sufficiently long with respect to the period of time during which the vehicle has moved by an amount corresponding to the tolerated location error. Such a long duration of integration is normally considered as prohibitive, but the present hybrid navigation method renders it practicable.

If the duration of integration is long, there result two consequences. First, the vehicle will be subjected to a substantial displacement during the time of integration. It is therefore necessary to use a method of signal extraction which must be insensitive to displacements of the vehicle. Further, the recursion frequency of the information of radio position becomes small. There is not available, therefore, at every instant of time, an information of radio position which could eventually be used for elaborating an error signal in the servo-loops of the inertial navigation system.

According to a further feature of the present invention, there is provided a means for representing the systematic errors of the inertial navigation system. This representation is in effect a mathematical formula giving the systematic errors, or drift of the inertial navigation system, as a function of time depending upon a number of parameters. The values of these parameters are obtained during the movement of the vehicle from the deviations between successive radio positions measured and the positions given at the same instants of time by the inertial navigation system.

Any accurate localization system can, in principle, be combined with an inertial system according to features of the present invention. However, in effect, when one is interested in long range position systems and in very fast aircraft, it is necessary to use long waves or waves utilizing the reflection from an artificial stable ionosphere or position methods by means of satellites or by radio or optical astronomy.

There will be described hereinafter one embodiment of the present invention, based on the use of long waves and intended for aircraft such as airplanes.

The proposed localization system utilizes the measurement of the distances of the vehicle to three guiding radio transmitters for determining the location of the aircraft. The signals used are analogous to those employed in the system well known under the name of LORAN C. and consist of radio frequency pulses with steep leading edges (for example 30 $\mu$ for the rise time of the signals) arranged to eliminate at reception the effect of the natural ionosphere.

The determination of the distance from the vehicle or craft to be located relative to a radio transmitter is not made, as in the LORAN C. or in other known hyperbolic systems, by comparing distances between each other, but by comparing the phase of the received signal to that of a high stability oscillator carried on the craft. This measurement is made in practice by determining the difference, or deviation, existing between the phase of the signal effectively received and the phase of the signal which would have been received if the position of the vehicle had been that indicated by the inertial navigation system duly corrected. This process has the result of rendering the signal extractor insensitive to the displacements of the vehicle during the duration of the integration. Also, the proposed process permits avoiding automatically the ambiguity due to the exclusive use of the phase of the carrier of the transmitted signals.

The distances to the guiding radio-transmitters are obtained afterwards by correcting, by the amount of the measured differences, the distances given by the compensated inertial navigation system. These distances being taken or measured at the moment at which the integration ends, the time assigned to each radio measurement is that of the end of the integration, whatever the duration of this integration may have been, provided however that the mathematical representation used for the correction of the errors of the inertial navigation system can describe same in a sufficiently precise manner during this interval of time. Therefore, the integration does not bring any delay into the measurement.

The position of the vehicle is deduced in a known manner from the three distances thus measured at the guiding radio-transmitters. A comparison is afterwards made with the position given by the inertial navigation system (without error compensation) for computing for the next period (by means of an electronic computer) a new set of parameters for the mathematical model, or representation, which model represents the systematic errors of said inertial navigation system.

A mixed or hybrid navigation system incorporating features of the present invention will next be described in detail with reference to the accompanying drawings.

DETAILED DESCRIPTION

Figure 1:
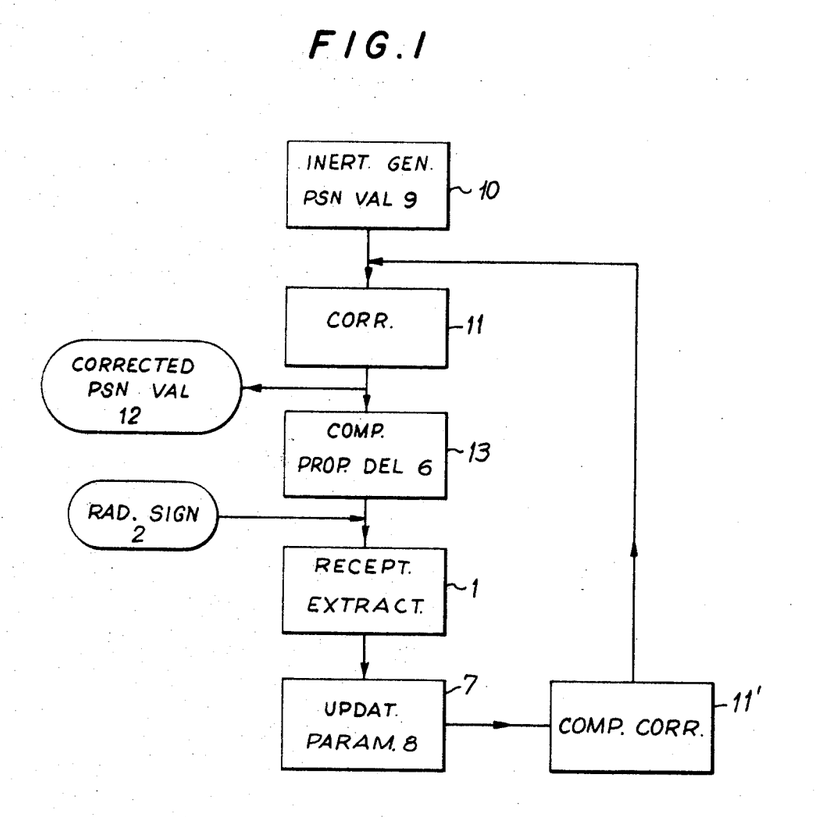
FIG. 1 is an operation diagram illustrating various features of the invention.

FIG. 1 is a block diagram illustrating schematically a flow of operations incorporating features of the present invention. The block 10 represents an operation of inertially generating position values 9, this operation being carried out by a conventional inertial navigation system.

The position values 9 are then corrected according to a program 11 of correction of these position values following a computation 11' of this correction, according to a mathematical model or representation of the systematic error of the inertial navigation system, i.e., of the deviation between the position values 9 and the true position values.

The corrected position values 12 thus obtained through execution of program 11 are available for use in controlling the governing of the vehicle, and for a sequence of operations which aims to update the parameters of the mathematical model and consists of computing, according to a program 13, propagation delays 6 from values 12 and of establishing by a signal extraction-operation 1, at each end of periodic radio-measurements, the differences between computed propagation delays and true propagation delays and then of computing, according to a program 7, new or updated values of the parameters 8 of the mathematical model.

The above mentioned "computed propagation delays", are those which should be obtained if the corrected position values 12 were true (obviously: if the correction performed according the deviation-mathematical-model used in program 11' were exact); said computed propagation delays are obtained through an operation 13 of computation from the corrected position values 12.

The signal extraction operation 1 consists of establishing, after a measurement cycle, the differences of the true propagation delays (corresponding to radio signal 2) with respect to the assumed delays (computed propagation delays 6).

From these differences and from non-corrected position values 9 and from assumed delays 6, a computation according to a program of computation 7 is made of new or "updated" values of the parameters 8 which are comprised in the aforesaid mathematical model, which mathematical model is computed according to program 11' as stated above. The next cycle of measurements then starts.

Figure 2:
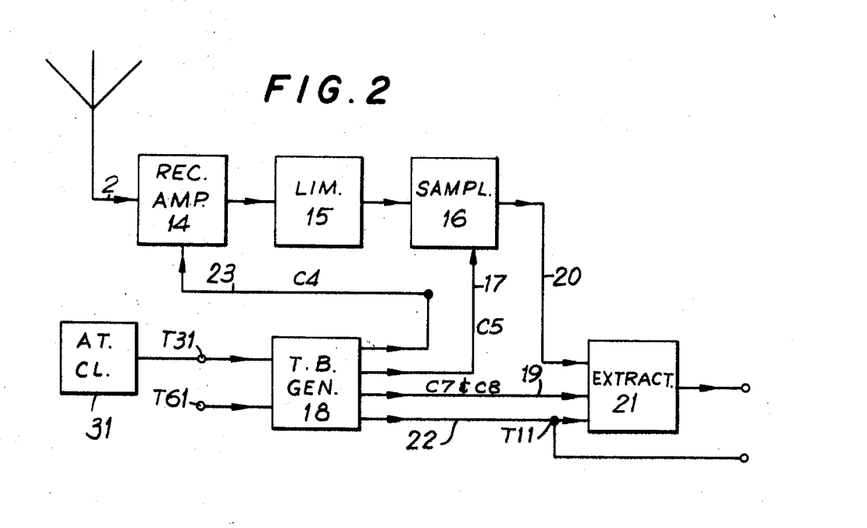
FIG. 2 is a block diagram of receiving and sampling means coupled with extractor and time base means employed in accordance with the invention.

Referring now to FIG. 2, it may be seen that the radio signal 2, from a guiding transmitter (not shown) is received and amplified in receiver-amplifier 14, which receiver is brought into operation by an unblocking or control signal (C4 in FIG. 3) received via line 23 from a time base generator 18.

The amplified signal is then limited in amplitude in limiter 15 and sampled by sampler 16 controlled by signals C5 received via line 17 from said time base generator 18. On the other hand, from the computed propagation delays 6 as well as from the indications of an atomic clock, 31, there is produced in time base generator 18 reference signals such as C7 and C8 (FIG. 3) which are transmitted on lines such as 19. From the limited-in-amplitude and sampled signal received via line 20 and from the reference signals on lines 19, there are computed in a circuit 21, which will be discussed hereafter with reference to FIG. 4, numbers representing the deviations between the computed propagation delays 6 and the true transmission delays. Signals representing these numbers are presented at terminal T 51. These delays are given in the form of phases and their differences in the form of phase differences, the computation of which is started at the end of each period of measurement, by synchronization signals on line 22 given by the time generator 18.

During the intervals separating the reception of two consecutive pulses of radio waves from guiding transmitters, there is applied via lines 23 and 17 to the receiver 14 and to the sampler 16 blocking signals generated by the time base generator 18. These signals are intended to render the system insensitive both to ionospheric echoes and to jamming between two consecutive pulses.

Figure 3:
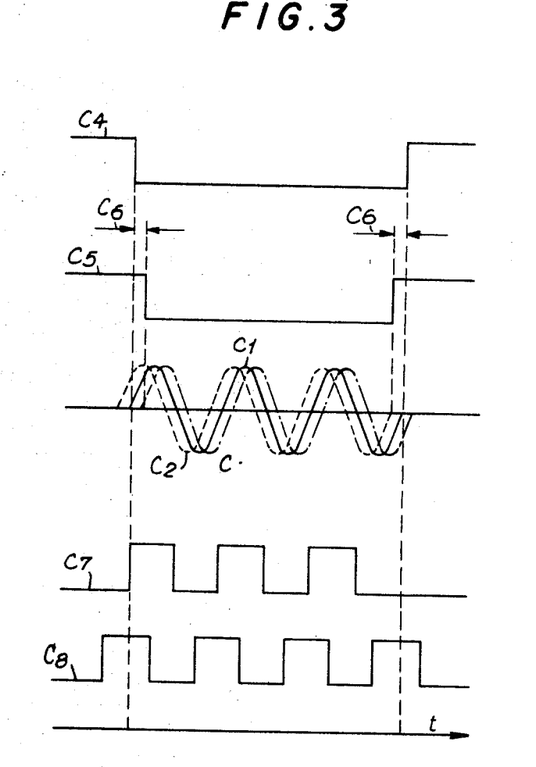
FIGS. 3 and 3(a) are charts of reference signal and blocking signals wave forms.

In a system embodying features of the present invention, the reference signals used for determining the phase of the received signals are constituted by square waves C7, C8 as shown in FIG. 3. It is possible to visualize said signal wave shapes as a sine and a cosine wave limited in amplitude, the phase of which is that computed from the indications of the inertial navigation system corrected of the deviation. Due to this correction, one knows the phase of the carrier wave within an approximation of $\pm d0$, $d0$ having a maximum equal to $\pi/4$ (this corresponds to knowing the position with an approximation of 300 meters for a wave length of 3,000 meters).

The reference signals are produced by flip-flop circuits, the instants of flip-flopping of which are obtained by counting, with a frequency sufficiently high such as, for example, 10 megacycles per second, the pulses which are provided by the atomic clock. This frequency (of, for instance, 10 magahertz) will, from now on, be referred to as the "high frequency". It must be understood that, since the reference signals have a much lower frequency, they are formed of a large number of H.F. pulses (equal to the ratio of respective frequencies). The reference signals might be, for illustrative purposes, considered as resulting from a "square modulation" of said H.F. pulses.

FIG. 3 shows the shape of the reference signals C7 and C8 and the shape of the blocking signals during the reception of one pulse with one of the two possible opposite phases for the carrier wave. Curve C1 shows the phase of the carrier such as computed from the corrected indications of the inertial navigation system. The curves C2 (in dotted lines) and C3 (in dash and dot lines) correspond to the maximum phase differences to be considered. Curve C4 is the blocking signal applied on line 23 to the receiver and curve C5 the blocking signal controlling the output of the sampler.

This last signal stops one-eighth of a period after the instant of time computed from the beginning of the signal and starts again one-eighth of a period before the instant of time computed at which arrives the first ionospheric echo. Thus, there are obtained two guarding intervals C6. The curves C7 and C8 represent reference signals in phase and 90° out of phase respectively.

Figure 3A:
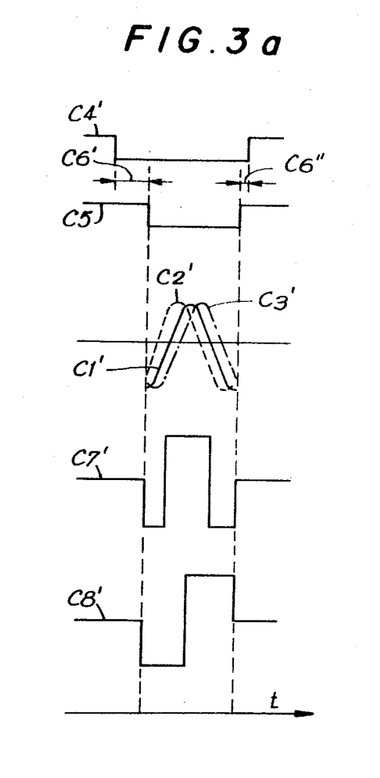

As an alternative, in some cases it is more advantageous, particularly with respect to the calibration, to reduce the duration of reception of one pulse to a single period of the radio frequency wave. FIG. 3(a) indicates the shapes that are assumed in this case by the reference signals in phase, curve C7', and signals 90° out of phase, curve C8', as well as the blocking signals, for the receiver, curve C4', and for the sampler, curve C5'.

The carrier wave with a phase such as computed from the corrected indications of the inertial navigation system is represented by the sinusoid wave C1' (solid line). The curves C2' (dotted line) and C3' (dash and dot line) correspond to waves having the maximum phase differences to be considered.

The interval of time during which the receiver is unblocked and during which the reference signals are different from zero is chosen in order to extend from three-eighths of the value of a period before the computed starting time of the signal, through nine-eighth of a period after this same instant of time. The blocking signal C5' of the sampler is chosen in order to stop three-eighth of a cycle after the unblocking instant of time of the receiver and to start again eleven-eighths of a cycle after the same. These values of three-eighth and eleven-eighth of a cycle correspond to an integral number of high frequency cycles.

There is thus provided an interval C6' of three-eighths of a cycle before unblocking the sampler which permits the establishment of the permanent values of the signal. Likewise, there is provided an interval C6' of one-eighth of a cycle between the blocking of the sampler and that of the receiver.

Figure 4:
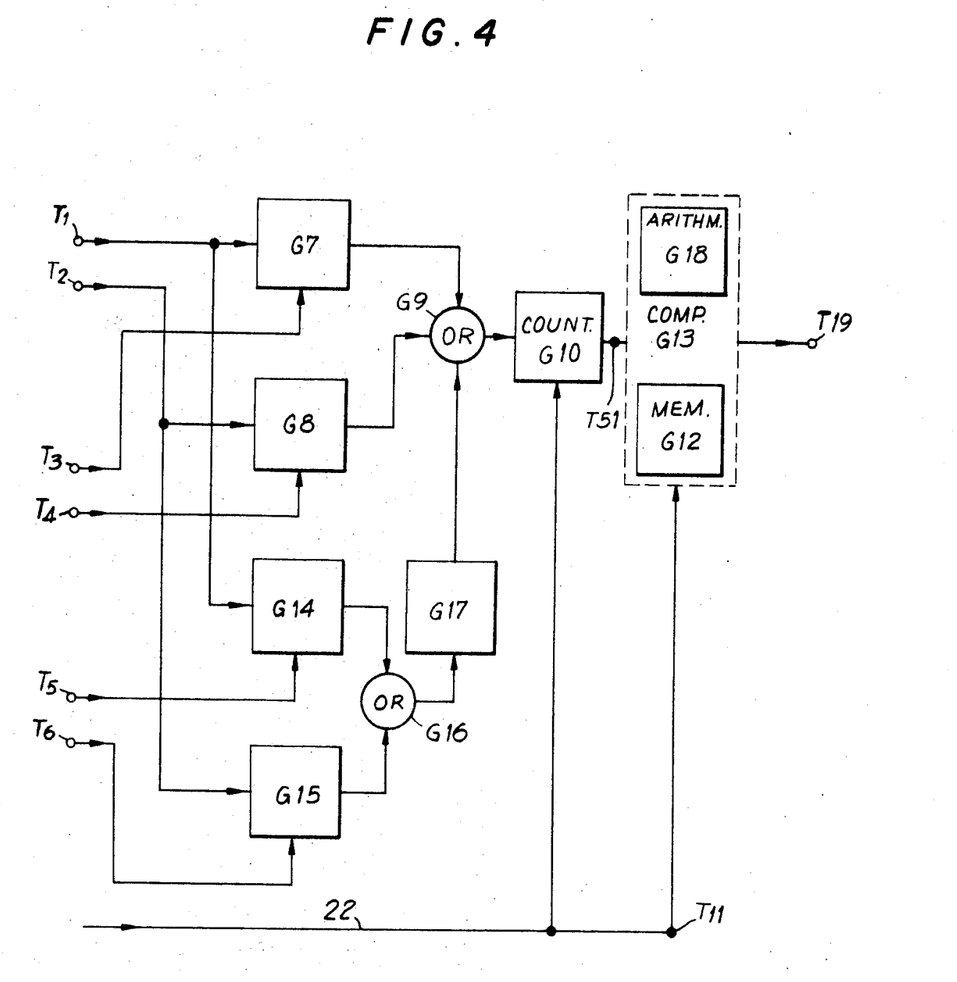
FIGS. 4 and 4(a) are block diagrams of a data handling system used in the practice of the invention.

In FIG. 4, there is shown a data handling system incorporating features of the present invention. This system is adapted to extract the phase deviation of the carrier wave with respect to the reference signals.

Figure 5:
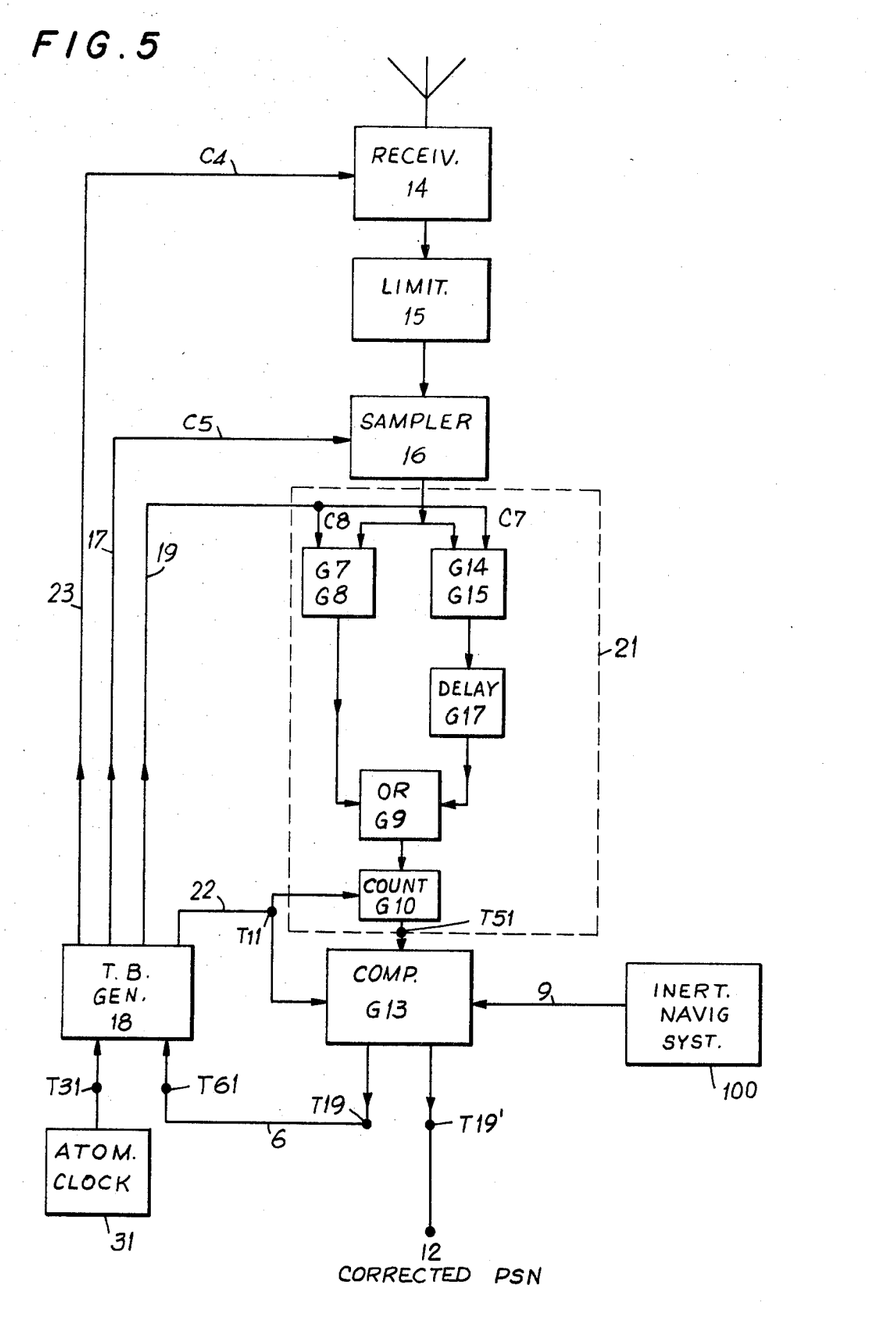
FIG. 5 is a block diagram showing the interconnection of the devices of FIGS. 2 and 4.

The interconnection of this system with the blocks of FIG. 2 may be seen on the block diagram of FIG. 5 where it must be noted that all connecting lines are represented schematically according to a "one line representation" in which there is represented one line for each category of signal. While, in FIG. 4, the plurality T 19 of output terminals of computer G 13 is generally represented by one terminal, it is resolved, in FIG. 5, into two lines, both belonging to the plurality T 19 of outputs of computer G13 and each concerning a different use.

The pulses of the sampled signals are applied to terminals T1 or T2 according to their polarity (positive at T1, negative at T2). The reference signal 90° out of phase is applied at terminal T3 or T4, according to its polarity. Likewise, the reference signal in phase is applied at terminals T5 and T6.

During the reception of one radio-frequency pulse, or during one radio-frequency period in the case of the above described alternative, the gates G7 and G8 controlled by pulses from terminals T3 and T4 and the "OR" circuit G9 transmit the impulses from terminals T1 and T2 to the counting device G 10. At the end of the reception, the figure recorded on this counting device is equal, up to a multiplicative constant, to the value of the product of the sampled signals by the signal 90° out of phase. A first synchronization signal applied to terminal T11 empties the counting device and transmits this figure to the memory G12 of the computer G13. During that period of time, the gates G14 and G15, controlled by pulses from terminals T5 and T6, and the "OR" circuit G16, transmit in their turn the pulses from terminals T1 and T2 to the counting device G10 where they arrive through the "OR" circuit G9 after having been delayed in G17 by a period of time sufficient for enabling the counting device G10 to return to zero (about 200 microseconds). The new figure recorded gives, with the same constant of proportionality, the product of the sampled signal by the reference signal in phase. A second synchronization signal transmitted to terminal T11 empties this second figure into the memory G12. Other synchronization signals from terminal 11 which are applied to the computer, introduce the addresses of all the figures which are given out by the counting device G10. To these figures are allocated six sections of the memory G12, two sections being allocated to each radio guiding transmitter, one of these sections corresponding to the product of the sampled signal by the signal 90° out of phase and the other to the product by the signal in phase. In each case, there is accumulated the sums of the figures given out by the counting device G10.

Since the reference signals contain a definite number of high frequency pulses it is obvious that if they are presented, together with the sampled signals, to the gates G15, G14, G8, G7, this will cause each one of said gates to present at its output, a number of pulses which depends upon the percentage of time during which the waves of the reference signal and of the sampled radio signal (applied to its inputs) are simultaneously of like sign (plus on gates 7 and 14, minus on gates 8 and 15).

For instance, the presentation of the reference signal C7 (in FIG. 3), in phase with the "computed phase", to the inputs T5 and T6 of gates T14 and T15 respectively and the presentation of the sampled signal to terminal T2 and T1, inputs of said gates will produce, on their respective outputs, a number of pulses which is equal to the maximum number of pulses which can be obtained, when, and only when, sampled and reference signals are in complete accordance with phase, i.e., if the "computed phase" is in accordance with the "true" phase.

Now, if the reference signal wave is shifted with respect to the radio wave, i.e., if there is a phase difference between reference and sampled signals, the outputs of the gates 15 and 14 will deliver to the OR gate G16, a number of pulses which is smaller than the preceding said maximum number, the difference (or number of missing pulses, with respect to the maximum number) being an integer representing, to a multiplicative constant, the magnitude (absolute value) of the phase difference between the radio wave (sampled signal) and the reference signal (the phase of the latter being as above mentioned that corresponding to the corrected position).

Since the phase shifted reference signal (C8, FIG. 3) which is applied to gates G7 and G8 presents a phase lag of $\pi/2$ it is obvious that the number of pulses which will be obtained from gates G7 and G8 will not generally be the same as the number of pulses delivered from gates G14 and G15.

It will be assumed, for instance, that the sampled radio wave (from guiding transmitter) has a phase-lag with respect to the reference signal 7 (the latter having a phase corresponding to the corrected position). The phase difference between the sampled wave and the $\pi/2$ phase-shifted reference signal C8 (FIG. 3) is then no more $\pi/2$ but smaller and the duration of time during which the waves of the signal C8 and the waves of the sampled signal are simultaneously of like signs will increase. There is then obtained from gates G8 and G7 a number of pulses which is increased with respect to the number of pulses which should have been obtained from the same gates if there were accordance between computed and true phases.

Conversely, if the sampled signal has a leading phase with respect to the reference signal C7, there is obtained from gates G7 and G8 a number of pulses which is smaller than the number of pulses which would result at the outputs of said gates if the computed and true phases were in accordance.

Thus, the pair of figures to which two sections of the memory are allocated for each radio guiding transmitter describe completely (in sign and in magnitude) the phase difference between the sampled signal and reference signal and it may be considered as representing this phase difference or, otherwise stated, as constituting to a scale coefficient, the phase difference or the propagation delays difference.

As above mentioned, this process has the result of rendering the "integrated" measures insensitive to the displacement of the vehicle during the duration of the "integration" (duration of the signal C5).

This can be seen in a very simple way by considering the fact that the phases of the reference signals are, during said integration, continuously in accordance with the corrected position values, which values change with the displacement of the vehicle. As a result, the displacement of the vehicle is represented, during the integration period, by both sampled and reference signals, their phases difference depending only upon the error in the amount of the correction computed according to program 11'.

At the end of the period of measurements, that is to say on the reception of about 5000 high frequency pulses, new synchronization signals at terminal T11 control the arithmetic unit G18 of the computer G13 for handling, from the figures inscribed in the pairs of memory sections, the three corresponding phases differences values. As these phase differences are to be used for purpose of computation of the new values of the deviation parameters 8 and as other computation operations, such as 11', 11, 7 and 13 in FIG. 1 are to be performed, it is obvious that preferably only one computer will be used. This computer may be any conventional commercially available air borne digital computer of general purpose type (see also page 313 "Navigation system for the C141A, Navigation" Journal of the Institute of Navigation (Winter 1963–1964)).

From the phase differences obtained in computer G13 and from the position values 9 presented by the inertial navigation system to computer G13, new values of the deviation parameters 8 are computed in computer G13 according to program 7 (FIG. 1) and the correction is computed according to program 11' and added to values 9 according to program 11.

Programs 7, 11' and 11 are pure computation programs, the features of which depend upon the constructional features of the particular inertial navigation system used, the choice of the inertial navigation system determines what kind of mathematical model is the best suited to represent the systematic error of the inertial navigation system.

The computer G13, being of a general purpose type is capable of performing any type of calculation whatsoever.

The performance of program 11' in computer G13 is in fact the computation of the systematic errors of the inertial navigation system according to a mathematical formula representing said systematical errors. If, in a most simple example, said formula gives linear relations between elapsed time $t$ and errors $dp_o, dp_1, \ldots dp_n$ on respective positions parameters $p_o, p_1, \ldots p_n$; which parameters are provided by a inertial navigation equipment, said formula may, for instance, have the form: $dp_o = a_o t$, $dp_1 = a_1 t$, $dp_n = a_n t, -a_o, a_1, \ldots a_n$ being the "updated" drift parameters describing the drift per unit of time of $P_o, P_1, \ldots P_n$ (or, stated otherwise, the positive or negative deviation of $p_o, p_1, \ldots p_n$ per unit of time).

In such a case, the program 11' would be a planning, stored in the computer, of the instructions permitting to effect the computation of $dp_o, dp_1, \ldots dp_n$ and, then, to correct $p_o, p_1, \ldots p_n$ by adding (algebraically) the $dp$'s to the corresponding $p$'s. While the program 7 would consist of the planning of the updating of the values of $a_o, a_1, \ldots a_n$, by measuring, from values 9 and 6 and from values presented at terminal T 51 the actual best value of each $a$ and, then writing it in computer memory in place of preceding values.

Planning such programs is usual programmer's work and will not be further detailed here.

The inertial navigation system 100 in FIG. 5, being not the particular purpose of the invention and being a well known device will also not be detailed nor discussed here. It is very simply connected to an input terminal of the computer G13, which computer picks up its indications in a known way.

Atomic clocks are also well known and there is accordingly no need of discussing the details of an atomic clock. As above mentioned, it is connected to input terminal T31 of time base generator 18 (FIG. 2).

The corrected position values 12 (FIG. 1) obtained from the computation according to program 11 in computer G13 are used not only to be presented at outputs T19' of computer G13 for use in controlling the governing of the vehicle, but also in the computer G13 to compute the "computed values" 6 (FIG. 1), i.e., the propagation delays which should be obtained if the corrected position values 12 were true.

These values 6 (FIG. 1) are, in fact, a pure translation (according to well known laws of propagation) of the position values 12 (FIG. 1) from a language of geometry into the "language of time delays" (i.e. of phases) being used.

These computed values are presented from output terminals T19 of the computer G13 to input T61 of time base generator 18 (FIG. 2) and are used to determine the instant of flip-flopping of flip-flop circuits.

As above mentioned, the reference signals are produced by flip-flop circuits, the instants of flip-flopping of which are obtained by counting the high frequency pulses provided by the atomic clock.

Moreover, since the computed values 6 aim to determine the phase of the reference signals, it is now obvious that, if a synchronization signal presented on line 22 (FIG. 2) to control terminal T11 of computer G13 causes the computer to transmit, from its output T19 to input T61 (FIG. 2) of time base generator 18 (FIG. 2), a computed value 6 (FIG. 1), this value will cause the counting (in 18) to advance or to lag so as to advance or to retard the instant of flip-flopping, which instant determines the phase of the reference signals corresponding to said computed value. Consequently are also determined the instants of time of the edges of the time-correlated signals, namely: blocking signals (on lines 17 and 23 in FIG. 2), respectively C5 and C4 in FIG. 3, and new synchronization signals, on line 22 (FIG. 2) presented to control terminal T11 of computer G13 in FIG. 4.

Figure 4A:
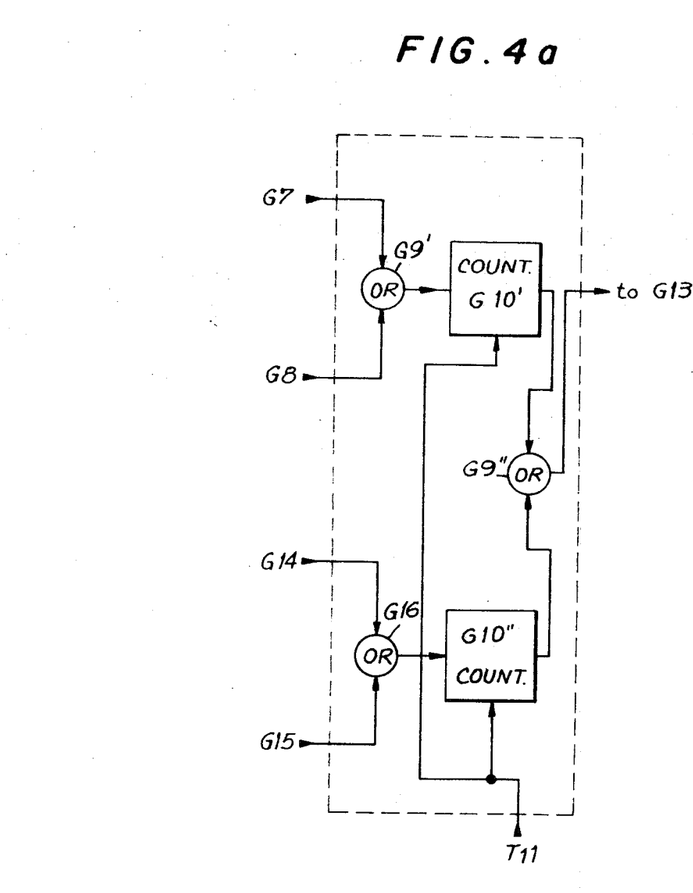

Instead of proceeding as indicated above, it may be advantageous, from the viewpoint of the difficulty of manufacturing the necessary delay lines, to replace the delay lines G17 by a second counting device. This alternative is presented by the circuit of FIG. 4(a). As will be seen, the pulses given out by the gates G7 and G8 pass through an "OR" circuit G9' to the counting device 10' and the pulses given out by the gates G14 and G15 are transmitted through the "OR" circuit G16' to a second counting device G10''. At the end of the reception, the synchronization signals on T11 successively empty the counting devices and the figures inscribed therein are transmitted into the computer G13 (FIG. 4) through the "OR" circuit G9''.

What is claimed is:

1. For locating a moving vehicle with the aid of at least two transmission stations transmitting location signals, a hybrid navigation system comprising an inertial navigation system on the vehicle, time base means for generating reference signals, reception means on the vehicle coupled to said time base means to receive location signals, extractor means coupled to said reception means and said time base means responsive to said location signals and said reference signals and extracting differences between phases of said location signals and phases of said reference signals, computing means coupled to said inertial navigation means and to said time base means and to said extractor means and computing, according to an error formula representing the drift of said inertial navigation system, a correction of the position issued from said inertial navigation system and a corrected position for use on the vehicle and computing, from said corrected position, the values of said phases of said reference signals which phases correspond to those which would have been received if the corrected position were true, said time base means being responsive to said values of said phases and controlling said receiver and said extractor means and said computing means, said computing means computing, from said phase differences and position values supplied by said inertial navigation system, updated values of the parameters of said error formula.

2. For locating a moving vehicle with the aid of at least two transmission stations transmitting location signals, a hybrid navigational system comprising inertial navigation means on the vehicle, time base means for generating reference signals, synchronization signals and blocking signals, reception means on the vehicle coupled to said time base means and responsive to said blocking signals to receive location signals, signal extractor means coupled to said reception means and time base means, and extracting differences between true propagation delays and computed propagation delays, computing means coupled to said inertial navigation means and to said time base means and to said extractor means and computing, according to a mathematical model, representing the drift of said inertial navigation system, a correction of the position issued from said inertial navigation system and a corrected position for use on the vehicle and computing, from said corrected position, said computed propagation delays, which propagation delays correspond to those which should have been received if the corrected position were true, said computing means being responsive to said synchronization signals and said time base means being responsive to the values of said computed propagation delays, issued from said computing means to determine the phase of said reference signals according to the phase corresponding to said computed propagation delays, said computing means computing, from said differences and from position values generated by said inertial navigation system, updated values of parameters comprised in said mathematical model.

3. For locating a vehicle with the aid of at least two transmission stations transmitting location signals, a hybrid navigation system comprising inertial navigation system on the vehicle, time base means for generating reference signals, synchronization signals and blocking signals, reception means on the vehicle coupled to said time base means and responsive to said blocking signals to receive location signals, signal extractor means coupled to said reception means and time base means and extracting a measurement of phase differences between location signals and said reference signals, said measurement being in the form of a number of pulses, a general purpose computer coupled to said inertial navigation system and to said time base means and to said extractor means and computing, according to an error formula representing the drift of said inertial navigation system, a correction of position values issued form said inertial navigation system and a corrected position for use on the vehicle and computing, from said corrected position, the values of phases of said reference signals, which phases correspond to those which would have been received if the corrected position were true, said general purpose computer being responsive to said synchronization signals and said time base means being responsive to the computed values of phases of the reference signals to determine the phase of said reference signals according to said computed values of phases, said computer computing, from said number of pulses, which represent said phase differences and, from the position values issued from said inertial navigation system, updated values of parameters comprised in said error formula.

4. A system as defined in claim 3 comprising sampling means controlled by said blocking signals and coupled to said reception means and said extractor means, said sampling means sampling the location signals for a definite duration, and a counting device in said extractor means integrating, for the same duration, a measurement of phase differences between location signals and reference signals, said computer including a memory, said counting device being controlled at the end of said duration by said synchronization signal for entering, into the memory of said computer, said measurement.

5. A system as defined in claim 1 comprising an atomic clock coupled to said time base means and supplying high frequency pulses used as a time reference for the signals generated by said time base means, said reference signals being pluralities of said high frequency pulses, the frequency of said reference signals being that of the carrier wave of the location signals.

6. A system as defined in claim 2 comprising an atomic clock coupled to said time base means and supplying high frequency pulses used as a time reference for the signals generated by said time base means, said reference signals being pluralities of said high frequency pulses, the frequency of said reference signals being that of the carrier wave of the location signals.

7. A system as defined in claim 4 comprising an atomic clock coupled to said time base means and supplying high frequency pulses used as a time reference for the signals generated by said time base means, and said reference signals being pluralities of said high frequency pulses, the frequency of said reference signals being that of the carrier wave of the location signals.

* * * * *

UNITED STATES PATENT OFFICE
CERTIFICATE OF CORRECTION

Patent No. 3,739,383  Dated June 12, 1973

Inventor(s) Gilbert Perot et al.

It is certified that error appears in the above-identified patent and that said Letters Patent are hereby corrected as shown below:

On the cover sheet [73] "assignee: Pechiney-Progil, Lyon, France" should read -- "assignee: Societe d'Etudes et Conseils A. E. R. O. and Gilbert Perot --.

Signed and sealed this 27th day of August 1974.

(SEAL)
Attest:

McCOY M. GIBSON, JR.
Attesting Officer

C. MARSHALL DANN
Commissioner of Patents